United States Patent [19]
Marulic et al.

[11] 3,751,079

[45] Aug. 7, 1973

[54] FIFTH WHEEL PLATE ASSEMBLY

[75] Inventors: Walter J. Marulic, Gary, Ind.; Ray L. Ferris, Thornton, Ill.

[73] Assignee: Pullman Incorporated, Chicago, Ill.

[22] Filed: Oct. 27, 1971

[21] Appl. No.: 193,011

[52] U.S. Cl. ...... 287/20.5 R, 248/119 S, 105/368 S
[51] Int. Cl. .............................................. F16d 9/00
[58] Field of Search ..................... 287/20.5 R, 20 R; 248/119 S; 105/368 S; 280/433

[56] References Cited
UNITED STATES PATENTS

| | | | |
|---|---|---|---|
| 3,087,748 | 4/1963 | Livelsberger et al. | 287/20 R |
| 3,145,006 | 8/1964 | Robinson et al. | 248/119 S |
| 2,880,681 | 4/1959 | Markestein et al. | 105/368 S |
| 3,234,893 | 2/1966 | Sweda | 105/368 S |
| 3,602,469 | 8/1971 | Hammonds | 287/20.5 X |

*Primary Examiner*—Andrew V. Kundrat
*Attorney*—Hilmond O. Vogel et al.

[57] ABSTRACT

A fifth wheel plate assembly for trailer hitches securing trailers to railway flat cars includes a top plate having an opening in which a movable lock jaw is supported for grasping and locking the kingpin of a trailer to the fifth wheel. The lock jaw is provided with extensions which are connected to a suitable screw type actuating assembly for moving the jaw to its closed position. In the closed position the jaws are locked by means of a lock bolt assembly which is moved into engaging position with the extensions to lock the jaw against movement. A lock bolt assembly also includes an indicating and latch assembly which in turn locks the locking bolt in the engaging position and indicates visually that it is locked.

5 Claims, 5 Drawing Figures

INVENTORS
WALTER J. MARULIC
RAY L. FERRIS
BY [signature] ATT'Y

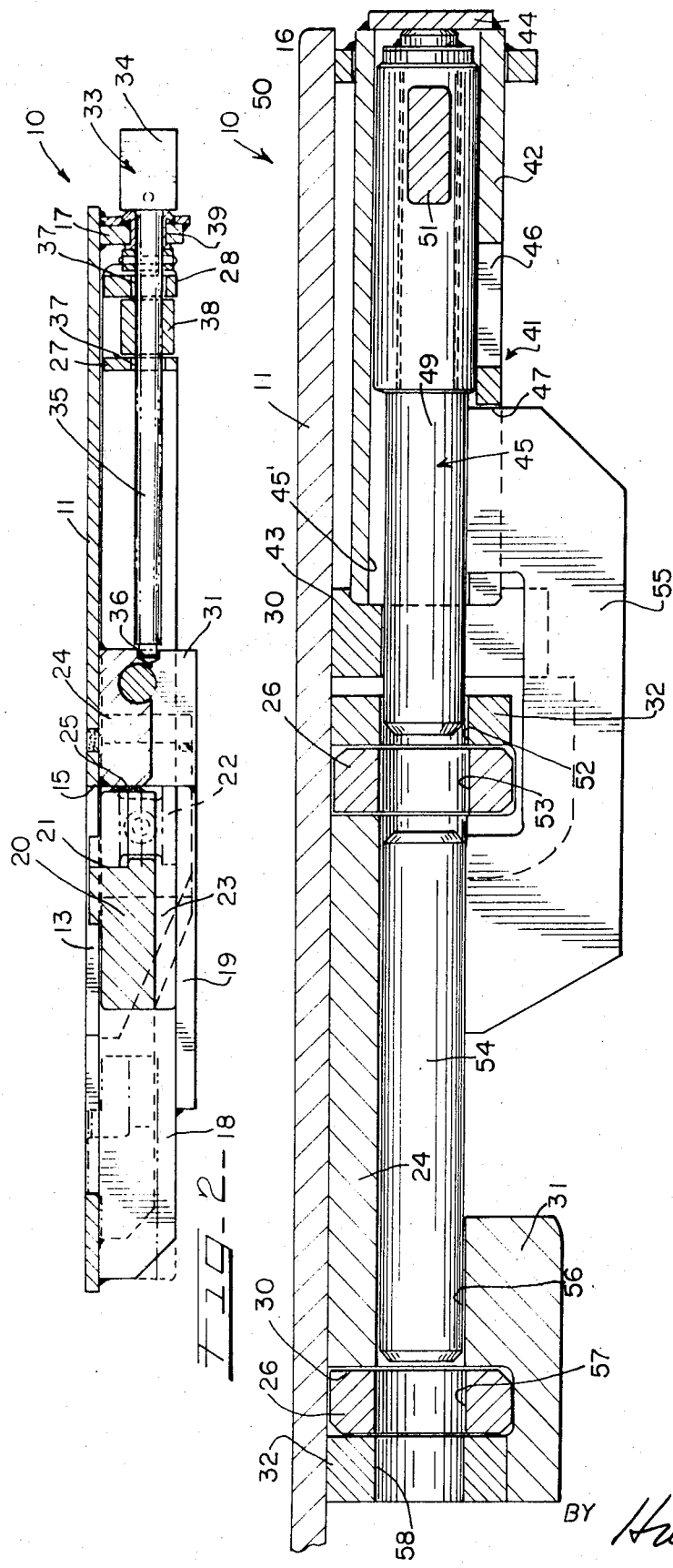

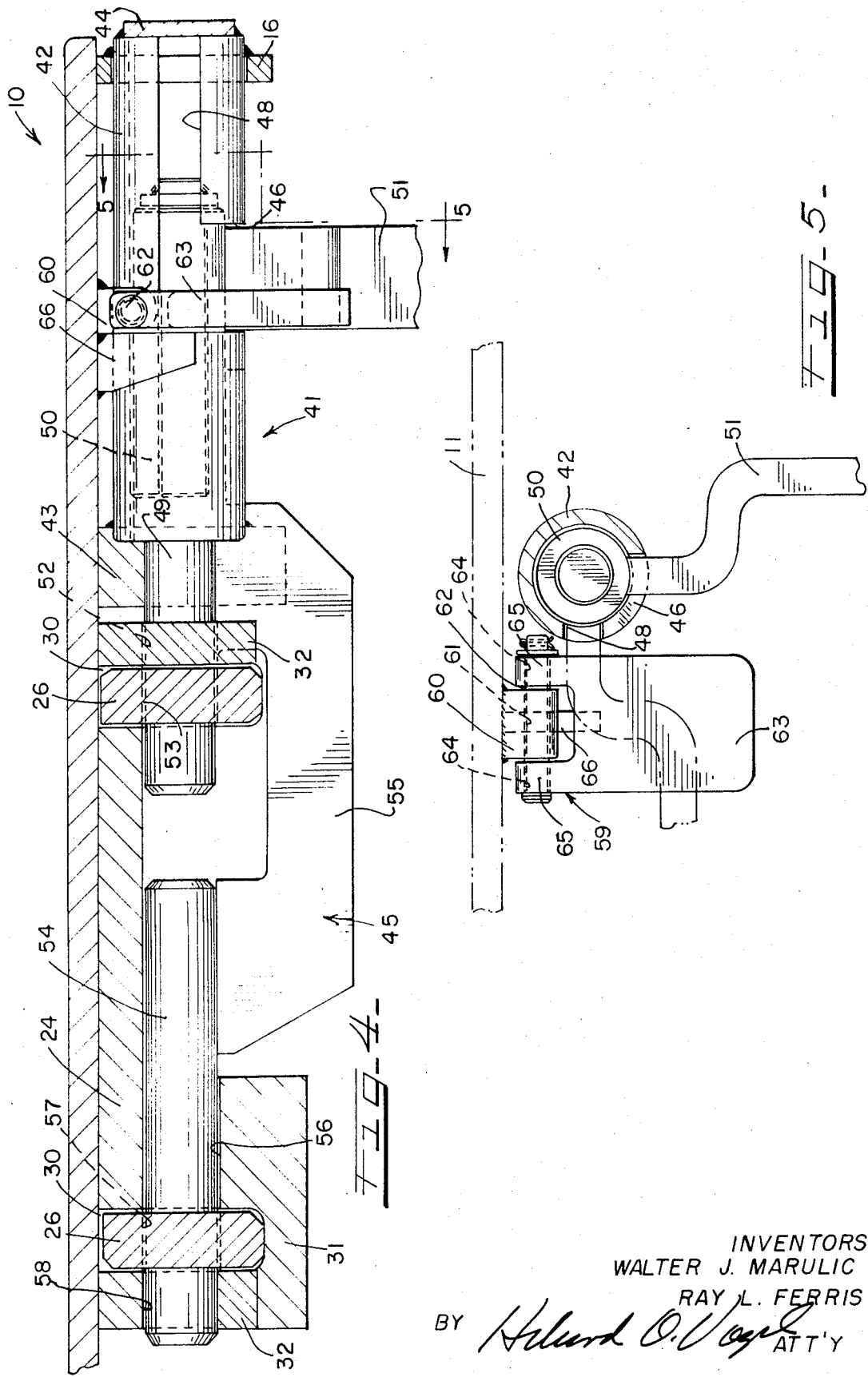

FIFTH WHEEL PLATE ASSEMBLY

BACKGROUND OF THE INVENTION

1. Field of the Invention

The invention pertains to fifth wheel assemblies and particularly to the type of fifth wheel which is utilized in connection with a trailer hitch for connecting trailers on railway flat cars.

2. Description of the Prior Art

The prior art is exemplified in such patents as No. 2,880,681, Apr. 7, 1959, No. 3,087,748, Apr. 30, 1963, No. 3,145,006, Aug. 18, 1964, and No. 3,234,893, Feb. 15, 1966.

SUMMARY OF THE INVENTION

The present invention relates to a fifth wheel assembly particularly suited for trailer-on-flat-car operations wherein the trailer is secured to the flat car by means of a trailer hitch including the present invention. In connecting trailer hitches' fifth wheel plates to the kingpin of a trailer, it is old in the art to utilize one or more jaws which are moved to locate the kingpin therebetween and to rigidly grasp the same in a locked position. The prime objective of the present invention is to improve this arrangement to include a positive locking device which under no conditions will permit the jaws to release the kingpin during train operations and which will indicate to the operator that the jaws are in the locked position. The present arrangement is particularly suited to accomplish this objective in that once the jaw is in connected engagement with the kingpin the locking device is moved into engagement with extensions on the jaw which then prevents the jaw from becoming accidentally unlocked, thus providing a failsafe condition under all exigencies of operation. The locking device which includes bolts that are moved into mating relation with bores provided on the extensions of the jaws cannot be so moved into the locked position unless the jaws themselves are in their proper locked position. The bolt includes a handle for actuating sliding movement to the locked and unlocked position, the said handle also providing indication that the bolt is locked in proper position when it is projecting vertically downwardly. A suitable movable stop arrangement prevents the handle from rotating out of its locked position and thus the bolt is restrained against movement.

BRIEF DESCRIPTION OF THE DRAWINGS

FIG. 2 is a cross sectional view taken substantially along the line 2—2 of FIG. 1;

FIG. 3 is a cross sectional view through a lock assembly taken along the line 3—3 of FIG. 1;

FIG. 4 is a cross sectional view taken substantially along the line 4—4 of FIG. 1; and FIG. 5 is a cross sectional view taken substantially along the line 5—5 of FIG. 4.

DESCRIPTION OF THE PREFERRED EMBODIMENT

Figure 1:
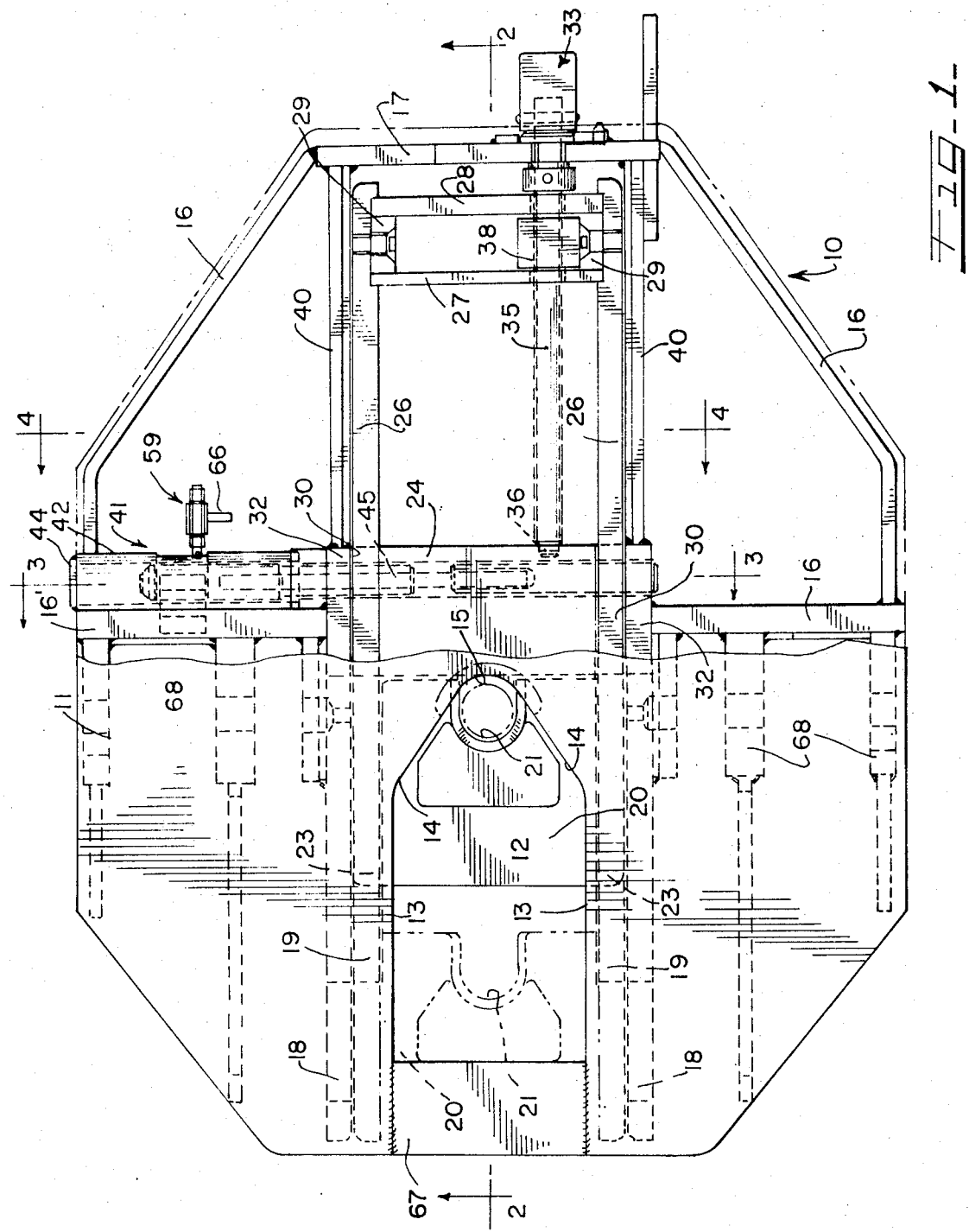
FIG. 1 is a plan view of a fifth wheel plate assembly with portions broken away to illustrate an operating device and locking mechanism.

Referring now particularly to FIG. 1, a fifth wheel plate assembly is generally designated by the reference character 10 and includes a substantially flat top plate 11 having an opening 12 including laterally spaced side walls 13 connected to converging walls 14 which in turn are connected to an arcuate wall 15. The top plate 11 is suitably reinforced on its underneath side by means of downwardly extending flanges 16 which at one end are connected to ribs 16' and at their other ends are connected to a thickened flange member 17. As best shown in FIG. 2, vertical track bars 18 are spaced on laterally opposite side of the opening 12 and include horizontally extending track ledges 19 on which a clamping block or jaw 20 is supported. The clamping block or jaw 20 includes a socket portion 21 which, as best shown in FIG. 2, is adapted to receive a kingpin 22 of a trailer in secure relation. The jaw 20 is provided with horizontally spaced slides 23 (FIGS. 1 & 2) which slide on the track or ledges 19 during movement of the jaw 22 between open and closed positions. As best shown in FIG. 2, the kingpin 22 is maintained within the socket 21 by means of a stationary block 24 having a clamping face 25. A pair of bar type extensions 26 are connected to the jaw 20 in horizontally spaced relation and spaced transverse bars 27 and 28 are connected to ends of extensions 26. Laterally spaced blocks 29 are secured to the bars 27 and 28 and in turn are suitably connected to the ends of the extensions 26, as best shown in FIG. 1.

Referring now to FIGS. 3 and 4, slots 30 are provided in depending portions 31 of the stationary block 24, the set slots being horizontally disposed and receiving the extensions 26 in relative guided relation. The slots 30 are closed on one side by means of guidance bars 32 suitably supported in the depending portions 31 of the stationary block 24.

A screw type actuating mechanism is generally designated at 33 for moving the jaw 20 from an open to a clamping position. The mechanism 33, as best shown in FIGS. 1 and 2, includes a suitable operating head 34 for connection to a screw 35 which at one end is supported in a recess 36 in the stationary block 24 and extends through openings 37 provided in the transverse bars 27 and 28. The end of the screw 35 adjacent the operating head 34 is suitably supported in bearing means 39 on the flange section 17. The threaded bearing block 38 is suitably supported against one of the blocks 29 and upon rotation of the screw 35 the threaded follower block 38 provides for longitudinal movement of the extensions 26 and the jaw 20. As best shown in FIG. 1, reinforcing ribs 40 are positioned on opposite side of the extensions 26 and are connected to the stationary block 24 and to the flange section 17.

A jaw lock assembly is generally designated by the reference character 41, as best shown in FIGS. 1, 3 and 4 and includes a tubular member or sleeve 42 which at one end is supported on a block 43 depending from the plate 11 and at its other end suitably supported on one of the flanges 16. The tubular member 42 is also provided at one end with a cap 44. A locking bolt means is generally designated at 45. The sleeve 42 includes a first vertical slot 46, best shown in FIGS. 3 and 5 and a second vertical slot 47 (FIG. 3). As best shown in FIG. 4, the sleeve further includes a horizontal slot 48. The lock bolt means 45 includes a first cylindrical lock bolt 49 reciprocally positioned for sliding movement within the tubular member 42. The lock bolt 49 has an enlarged cylindrical extension 50 slidably disposed in a bore 45' in the tubular member 42 and has connected thereto a handle and indicating member 51 for moving the same. The position of the handle will indicate when the jaw has been locked by means of the lock bolt means 45. As best shown in FIGS. 3 and 4, a bore 52 is provided in one of the guide bars 32. A bore 53 adapted to register with the bore 52 is provided in one of the extensions 26. A second bolt is indicated at 54 and is disposed in longitudinally spaced relation relative to the first bolt 49. A bridging plate 55 connects the bolts 54 and 45 for conjoint movement. A bore 56 is provided in the depending portion 31 through which the bolt 54 may slide. Another bore 57 is provided in the other of the extensions 26 and is adapted to be placed into registry with the bore 56. Another bore 58 registers with the bore 56 and is disposed in the other of the guide bars 32.

A latch assembly 59 is positioned adjacent the jaw locking assembly 41 and includes a downwardly projecting bracket 60 which as best shown in FIG. 5 is provided with a horizontal bore 61 in which a pivot pin 62 is disposed. A stop member 63 is suitably apertured and includes aligned bores 64 disposed in legs 65. A backstop 66 projects downwardly from the plate 11 to limit movement of the stop 63 in one direction. As best shown in FIG. 1, the jaw 20 shown in broken lines is in an open position against a transversely extending stop plate 67, forming one end of the opening 20.

OPERATION

While in the present disclosure the fifth wheel plate is not shown in its functional attachment to the vertical and diagonal pedestals of a trailer hitch, this is conventional in the art as indicated in the aforementioned patents. The plate 11 has suitable downwardly projecting brackets 68 disposed on opposite sides thereof to which the upper ends of a vertical pedestal (not shown) may be connected, the same being in turn connected to a diagonal leg and both being suitably supported on the deck of a flat car. In the erect position the trailer is positioned so that the kingpin 22 is disposed in the opening 20 and a suitable tool is inserted into the screw type actuating mechanism operating head 34 causing rotation of the screw 35 which in turn causes movement of the jaw 20 from the dotted line position shown in FIG. 1 to the closed position wherein the kingpin 22 is in locked position with the jaw 20 tightly securing the kingpin in the socket 21. Thus, as shown in FIGS. 1 and 2, the kingpin is firmly engaged and retained by means of the jaw 20. The operator now grasps the handle 51 which is in the unlocked position in FIG. 3 and moves the handle 51 through the slot 48, at the same time lifting up the stop member 63 by rotating the same in a counterclockwise manner about its pivot 62 from the position shown in FIG. 4. Since the stop 63 is out of the way, the handle 51 may be moved out of the slot 48 and may then be pivoted downwardly into the position shown in FIGS. 4 and 5 by rotating the handle from the dotted line position in FIG. 5 to the full line position. During this movement the bolts 49 and 54 are moved through the aligned bores 52, 53, 56, 57 and 58 so that the extensions 26 are now rigidly engaged and the jaw 26, therefore, is firmly locked in the closed position. It is, of course, necessary that the jaw be completely closed properly and in engagement with the kingpin in order for the bores 53 and 57 to be placed in aligned or registering positions so that the bolts 49 and 54 can be placed in locked relation. Thus, bores 53 and 57 serve as keeper means. Since the stop 63 has returned to the position shown in FIG. 5 blocking the handle 51, it is impossible for the handle 51 to move from the slot 46 so that the same is now also firmly locked and latched therein. In order to disengage the bolt from the locked position the stop 63 again must be rotated counterclockwise to a raised position, clear and out of the path of movement of the handle 51 for the handle again to be shifted into the horizontal slot 48 and then retracted from the engaging or locking position. Thus, it is clear that once the locking assembly is in the locked condition no amount of vibration or other operating conditions of the railway car can dislodge the bolts from the locked position. Only the manual rotation of the stop 63 to an out-of-the-way position will permit the handle to be rotated into its disengaging or shifted position so that the bolt can be withdrawn. Also, if the jaw is not completely locked, the locking action will not take place. The instructions usually imprinted on a trailer hitch will indicate that in the vertical or full line position of FIG. 5 of the handle 51 will indicate to the operator that the locked position has been achieved. Thus, the handle also serves as the indicator to the operator that all is in order and that a failsafe condition is achieved.

What is claimed is:

1. A fifth wheel for connection to the kingpin of a highway trailer comprising:

a top plate having a substantially rectangular opening including parallel side walls and converging walls connected by an arcuate wall position, slide supports supported below said plate adjacent said side walls of said opening, a first clamping block including slide means supporting said block on said slide supports for movement within said opening, said block including an open end recess, a second stationary clamping block supported below said plate and including a surface cooperating with said open end recess during a locked position of said blocks to hold a kingpin in confined relation, said slide means including an extension connected to said first block and projecting longitudinally relative to said opening, drive means connected to said extension for moving said first block from and to said locked position, a lock assembly including a locking bolt, means slidingly supporting said bolt on said plate for movement relative to said extension, handle means on said locking bolt for moving the same, keeper means on said extension engageable by said bolt for maintaining said blocks in said locked position, and a movable latch means supported on said top plate, said movable latch means in one position blocking movement of said handle to retain said locking bolt in said engaging position, said latch means being manually movable to a second position to permit movement of said handle and bolt to an unlocked position.

2. The invention in accordance with claim 1, said extension comprising a pair of laterally spaced bars, said keeper means comprising first openings in said bars engaged by said bolt.

3. The invention in accordance with claim 2, including guideway means carried beneath said plate engaged by said bars in sliding relation, said guideway means including a second opening respectively in registry with said first openings and being also engaged by said bolt.

4. The invention in accordance with claim 3, said bolt comprising a pair of bolt elements spaced longitudinally endwise and respectively engageable with said first and second openings, and a bridging member connecting said bolt elements.

5. The invention in accordance with claim 1, said latch means comprising a member hingedly connected to said top plate, and vertically depending therefrom in said blocking position, and extending substantially horizontally in said second position, said bolt and handle being rotatable about a horizontal axis upon movement of said hinged member to said second position.

* * * * *